United States Patent
Park et al.

(10) Patent No.: US 12,027,162 B2
(45) Date of Patent: Jul. 2, 2024

(54) NOISY STUDENT TEACHER TRAINING FOR ROBUST KEYWORD SPOTTING

(71) Applicant: GOOGLE LLC, Mountain View, CA (US)

(72) Inventors: Hyun Jin Park, Palo Alto, CA (US); Pai Zhu, Long Island, NY (US); Ignacio Lopez Moreno, New York, NY (US); Niranjan Subrahmanya, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 175 days.

(21) Appl. No.: 17/190,779

(22) Filed: Mar. 3, 2021

(65) Prior Publication Data

US 2022/0284891 A1   Sep. 8, 2022

(51) Int. Cl.
*G10L 15/22*      (2006.01)
*G06F 18/24*     (2023.01)
(Continued)

(52) U.S. Cl.
CPC ............. *G10L 15/22* (2013.01); *G06F 18/24* (2023.01); *G10L 15/063* (2013.01); *G10L 15/08* (2013.01);
(Continued)

(58) Field of Classification Search
CPC ....... G10L 15/22; G10L 15/063; G10L 15/08; G10L 21/0208; G10L 2015/088;
(Continued)

(56) References Cited

U.S. PATENT DOCUMENTS

2019/0205748 A1*  7/2019  Fukuda ................ G06N 3/0454
2019/0287515 A1*  9/2019  Li ......................... G10L 15/063
(Continued)

FOREIGN PATENT DOCUMENTS

CN   110097178          8/2019
CN   110826458          2/2020
CN   111653274 A   *  9/2020  ........... G10L 15/063

OTHER PUBLICATIONS

Jinyu Li, Rui Zhao, Zhuo Chen, Changliang Liu, Xiong Xiao, Guoli Ye, and Yifan Gong, "Developing Far-Field Speaker System via Teacher-Student Learning", 2018, Microsoft AI & Research, Redmond, WA 98052, 1-5 (Year: 2018).*
(Continued)

*Primary Examiner* — Richemond Dorvil
*Assistant Examiner* — Nadira Sultana
(74) *Attorney, Agent, or Firm* — Gray Ice Higdon (57) ABSTRACT

Teacher-student learning can be used to train a keyword spotting (KWS) model using augmented training instance(s). Various implementations include aggressively augmenting (e.g., using spectral augmentation) base audio data to generate augmented audio data, where one or more portions of the base instance of audio data can be masked in the augmented instance of audio data (e.g., one or more time frames can be masked, one or more frequencies can be masked, etc.). Many implementations include processing augmented audio data using a KWS teacher model to generate a soft label, and processing the augmented audio data using a KWS student model to generate predicted output. One or more portions of the KWS student model can be updated based on a comparison of the soft label and the generated predicted output.

11 Claims, 6 Drawing Sheets

(51) Int. Cl.
G10L 15/06 (2013.01)
G10L 15/08 (2006.01)
G10L 21/0208 (2013.01)

(52) U.S. Cl.
CPC .... *G10L 21/0208* (2013.01); *G10L 2015/088* (2013.01); *G10L 2015/223* (2013.01); *G10L 2021/02082* (2013.01); *G10L 2021/02087* (2013.01)

(58) Field of Classification Search
CPC ..... G10L 2015/223; G10L 2021/02082; G10L 2021/02087; G06K 9/6267
See application file for complete search history.

(56) References Cited

U.S. PATENT DOCUMENTS

| | | | |
|---|---|---|---|
| 2019/0325308 A1 | 10/2019 | Chung et al. | |
| 2019/0354808 A1* | 11/2019 | Park | G06K 9/6257 |
| 2019/0378006 A1* | 12/2019 | Fukuda | G06N 3/08 |
| 2020/0026760 A1* | 1/2020 | Chiu | G06F 40/40 |
| 2020/0126537 A1* | 4/2020 | Guevara | G10L 15/22 |
| 2020/0334538 A1* | 10/2020 | Meng | G06N 3/0454 |
| 2020/0349927 A1* | 11/2020 | Stoimenov | G10L 15/16 |
| 2021/0304769 A1* | 9/2021 | Ye | G10L 15/065 |
| 2022/0262352 A1* | 8/2022 | Tian | G06F 40/279 |

OTHER PUBLICATIONS

Murat Akbacak, Lukas Burget, Wen Wang, Julien van Hout, "Rich System Combination for Keyword Spotting in Noisy and Acoustically Heterogeneous Audio Streams", 2013, IEEE, pp. 8267-8271 (Year: 2013).*

He, Y. et al., "Streaming End-to-End Speech Recognition for Mobile Devices;" 2019 International Conference on Acoustics, Speech and Signal Processing (ICASSP); 5 pages; May 12, 2019.

Park, H-J. et al., "Learning to Detect Keyword Parts and Whole by Smoothed Max Pooling;" ICASSP 2020—2020 IEEE International Conference on Acoustics, Speech and Signal Processing (ICASSP); pp. 7899-7903; May 2020.

Alvarez, R. et al., "End-to-End Streaming Keyword Spotting;" ICASSP 2019—2019 IEEE International Conference on Acoustics, Speech and Signal Processing (ICASSP); pp. 6336-6340; 2019.

Gruenstein, A. et al., "A Cascade Architecture for Keyword Spotting on Mobile Devices;" in 31st Conference on Neural Information Processing Systems (NIPS 2017); 4 pages; 2017.

He, Y. et al., "Streaming Small-Footprint Keyword Spotting Using Sequence-to-Sequence Models;" 2017 IEEE Automatic Speech Recognition and Understanding Workshop (ASRU); pp. 474-481; 2017.

Sainath, T. et al., "Convolutional Neural Networks for Small-Footprint Keyword Spotting;" in Proceedings of Annual Conference of the International Speech Communication Association (Interspeech); pp. 1478-1482; 2015.

Wu, M. et al., "Monophone-Based Background Modeling for Two-Stage On-Device Wake Word Detection;" in Proceedings of IEEE International Conference on Acoustics, Speech and Signal Processing (ICASSP); pp. 5494-5498; 2018.

Guo, J. et al., "Time-Delayed Bottleneck Highway Networks Using a DFT Feature for Keyword Spotting;" in Proceedings of IEEE International Conference on Acoustics, Speech and Signal Processing (ICASSP); pp. 5489-5493; 2018.

Sun, M. et al., "Compressed Time Delay Neural Network for Small-Footprint Keyword Spotting," in Proceedings of Annual Conference of the International Speech Communication Association (Interspeech); 5 pages; Aug. 2017.

Panchapagesan, S. et al., "Multi-task learning and Weighted Cross-entropy for DNN-based Keyword Spotting," in Proceedings of Annual Conference of the International Speech Communication Association (Interspeech); 5 pages; Sep. 2016.

Siri Team, "Hey Siri: An On-device DNN-powered Voice Trigger for Apple's Personal Assistant," https://machinelearning.apple.com/research/hey-siri; 11 pages; Oct. 2017.

Van den Oord, A. et al., "Representation Learning with Contrastive Predictive Coding," Cornell University; arXiv.org; arXiv:1807.03748; 13 pages; Jul. 10, 2018.

Lowe, S. et al, "Putting an End to End-to-End: Gradient-Isolated Learning of Representations;" 33rd Conference on Neural Information Processing Systems (NeurIPS); 15 pages; 2019.

Schneider, S. et al., "wav2vec: Unsupervised Pre-training for Speech Recognition;" Proceedings of Annual Conference of the International Speech Communication Association (Interspeech); pp. 3465-3469; Sep. 2019.

Elibol, O. et al., "Semi-supervised and Population Based Training for Voice Commands Recognition;" ICASSP 2019—2019 IEEE International Conference on Acoustics, Speech and Signal Processing (ICASSP); Brighton, United Kingdom; pp. 6371-6375; 2019.

Baevski, A. et al., "wav2vec 2.0: A Framework for Self-Supervised Learning of Speech Representations;" Cornell University, arXiv.org; arXiv:2006.11477; 19 pages; Oct. 22, 2020.

Xie, Q. et al., "Self-training with Noisy Student improves ImageNet classification;" Proceedings of the IEEE/CVF Conference on Computer Vision and Pattern Recognition (CVPR); pp. 10687-10698; 2020.

Zhai, X. et al., "S4L: Self-Supervised Semi-Supervised Learning;" In Proceedings of the IEEE International Conference on Computer Vision (ICCV); pp. 1476-1485; 2019.

Li, X. et al., "Learning to Self-Train for Semi-Supervised Few-Shot Classification;" Cornell University; arXiv.org; arXiv:1906.00562; 14 pages; Sep. 29, 2019.

Chowdhury, A. et al., "Automatic Adaptation of Object Detectors to New Domains Using Self-Training," In Proceedings of the IEEE Conference on Computer Vision and Pattern Recognition (CVPR); pp. 780-790; 2019.

He, J. et al., "Revisiting Self-Training for Neural Sequence Generation;" Cornell University, arXiv.org; arXiv:1909.13788; 13 pages; Sep. 30, 2019.

Prabhavalkar, R. et al., "Automatic Gain Control and Multi-Style Training for Robust Small-Footprint Keyword Spotting with Deep Neural Networks;" in Proceedings of International Conference on Acoustics, Speech and Signal Processing (ICASSP); pp. 4704-4708; 2015.

Park, D. et al., "SpecAugment: A Simple Data Augmentation Method for Automatic Speech Recognition," Interspeech 2019, pp. 2613-2617, Sep. 2019.

Park, D. et al., "SpecAugment on Large Scale Datasets;" ICASSP 2020—2020 IEEE International Conference on Acoustics, Speech and Signal Processing (ICASSP); pp. 6879-6883; 2020.

Park, D. et al., "Improved Noisy Student Training for Automatic Speech Recognition," Interspeech 2020; pp. 2817-2821; Oct. 2020.

Mosafi, I. et al., "DeepMimic: Mentor-Student Unlabeled Data Based Training;" International Conference on Artificial Neural Networks (ICANN), Springer LNCS, vol. 11731, pp. 440-455; Sep. 2019.

* cited by examiner

NOISY STUDENT TEACHER TRAINING FOR ROBUST KEYWORD SPOTTING

BACKGROUND

Speech processing techniques can be used to determine feature(s) in spoken utterances. For example, audio data capturing the spoken utterance can be processed using a speech processing model (e.g., a keyword spotting model, a speech recognition model, a natural language intent model, etc.) to generate output indicative of one or more features of the spoken utterance. For instance, the audio data capturing the spoken utterance can be processed using a keyword spotting (KWS) model to generate output indicating whether one or more keywords is present in the spoken utterance. Student-teacher learning can be used in training a KWS model. Student teacher learning is a type of transfer learning where knowledge of the posterior probabilities of training instance(s) evaluated by the teacher model may be transferred to the student model.

SUMMARY

Techniques disclosed herein are directed towards student teacher learning to train a keyword spotting (KWS) model. In many implementations disclosed herein, the teacher model after being trained based on supervised data, can be used to process augmented data to generate corresponding soft labels. Further, the augmented data can also be processed using the student model to generate corresponding predictions, and the student model can be updated based on comparing the corresponding predictions to the corresponding soft labels. This can, for example, enable aggressive augmentation in generating the augmented data. In some implementations, the KWS model can be trained using aggressively augmented labeled and/or unlabeled audio data.

In some implementations, student teacher learning techniques described herein can be utilized to train a keyword spotting (KWS) model to identify whether a spoken utterance includes one or more keywords. For example, a KWS model can process a spoken utterance of "OK Assistant, set the temperature to 70 degrees" to generate output indicating whether a portion of the spoken utterance contains the keyword "OK Assistant". As a further example, a KWS model can process a spoken utterance of "send directions to Hypothetical Café to my phone" to generate output indicating whether the spoken utterance contains the keyword "Hypothetical Café". In some implementations, keyword spotting is a binary classification problem, where a KWS model can generate output indicating the spoken utterance does contain or does not contain a given keyword.

In some implementations, data augmentation can be used to increase the amount and/or diversity of training data by modifying existing training data. For example, noise can be added to an instance of base audio data to generate an augmented instance of audio data, where the model can be trained using the instance of base audio data and/or the augmented instance of audio data. In some implementations, aggressive data augmentation can mask significant portion(s) of an instance of base audio data. For example, spectral augmentation can be applied to the instance of base audio data to mask one or more frequencies in the base audio data and/or to mask one or more complete time frames in the base audio data.

Such modification can significantly alter a supervised label and/or a semi-supervised label for an instance of audio data such that the corresponding augmented audio data no longer corresponds with the supervised label and/or the semi-supervised label for the instance of audio data. For example, a base instance of audio data can capture a spoken utterance of "OK Assistant" with a corresponding supervised label of 'true' to indicate the keyword 'OK Assistant' is included in the spoken utterance. In some implementations, an augmented instance of audio data can mask the time frame(s) in the base instance of audio data between the words 'OK' and 'Assistant' such that the augmented instance of audio data can capture the augmented spoken utterance of "OK***Assistant" (where * indicates a masked time frame of audio data). The supervised label corresponding to the base instance of audio data of 'true' can still correctly indicate the augmented spoken utterance includes the keyword of 'OK Assistant'.

In some other implementations, an additional instance of audio data can mask the time frame(s) in the base instance of audio data capturing the 'Assista' portion of the spoken utterance such that the additional instance of augmented audio data can capture the additional augmented spoken utterance of "OK ******nt" (where * indicates a masked time frame of audio data). The additional augmented spoken utterance no longer contains the keyword 'OK Assistant', therefore the supervised label corresponding to the base instance of audio data of 'true' no longer correctly corresponds to the additional augmented spoken utterance.

In some implementations, an initial KWS teacher model can be trained using labeled instances of audio data. The initial KWS teacher can be used in an initial iteration of training the KWS student model. At an initial iteration, the KWS student model can be trained using an instance of augmented audio data, where the initial KWS teacher can process the instance of augmented audio data to generate a soft label and the KWS student model can process the instance of augmented audio data to generate student output. One or more portions of the KWS student model can be updated based on comparing the soft label and the generated student output. At a next iteration of training the student model, the current iteration of the teacher model can be set to the student model of the previous iteration, where the current iteration of the teacher model can process an additional instance of augmented audio data to generate an additional soft label, the current iteration of the student model can process the additional instance of augmented audio data to generate additional student output, and the current iteration of the student model can be updated based on comparing the additional soft label and the additional student output.

Implementations described herein are directed towards KWS. However, this is not meant to be limiting. Student teacher learning with aggressive data augmentation techniques described herein can be used in a variety of detection problems with discrete domains. For example, techniques described herein can be applied to training an anomaly detection model, wherein an instance of vision data can be processed using an anomaly detection model to determine whether the instance of vision data contains an anomaly. Additionally or alternatively, techniques described herein can be applied to training an irregular heartbeat model, where a heartbeat signal can be processed using the irregular heartbeat model to determine whether the heartbeat signal contains an irregular heartbeat.

Accordingly, various implementations set forth techniques for training KWS models using student teacher learning with aggressively augmented instances of audio data. Using conventional techniques a KWS teacher model is trained to generate hard labels. However, aggressively augmented training instances may be augmented such that the training label no longer correctly corresponds to the augmented audio data. A KWS teacher model generating hard label output may be unable to reflect this degradation of the input audio data.

Conversely, implementations disclosed herein can utilize a KWS teacher model which can generate soft label output. In some implementations, the soft labels can accurately reflect the degradation of the input audio data, thus enabling the KWS teacher model to accurately process aggressively augmented training data instance(s).

In some implementations, the use of aggressively augmented training instance(s) can increase the amount of data available to train. In some implementations, this can prevent the overfitting of the training data to the KWS model. Additionally or alternatively, using aggressively augmented training instances can reduce the number of training instances which need to be captured and/or labeled thus saving computing resources (e.g., memory, power, processor cycles, etc.). In other words, capturing audio data and/or labeling audio data can be computationally expensive. By aggressively augmenting training instance(s), additional training data can be generated without the computational expense of capturing as many instances of audio data. Additionally or alternatively, aggressively augmenting training instance(s) can increase the diversity of the training data which can lead to more robust and/or more accurate training of the KWS model. For example, a model trained with more diverse training instances may perform better in situations where excessive background noise, excessive reverberation, etc. is captured in the audio data along with a given spoken utterance compared to a model trained with less diverse training instances.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Techniques disclosed herein can include self-training with a noisy student-teacher approach for streaming keyword spotting, which can utilize large-scale unlabeled data and aggressive data augmentation. The proposed method can apply aggressive data augmentation (e.g., spectral augmentation) on the input of both the student model and the teacher model and can utilize unlabeled data at scale, which can significantly boosts the accuracy of the student model against challenging conditions. Such aggressive augmentation usually degrades model performance when used with supervised training with hard-labeled data.

Supervised learning has been the major approach in keyword spotting area. Although it has been successful, supervised learning requires high quality labeled data at scale, which often requires expensive human efforts or costs to obtain. Motivated from such difficulty, semi-supervised learning and/or self-training approaches have been used for keyword spotting. Semi-supervised learning and/or self training can utilize large unlabeled data in addition to smaller amounts of labeled data and achieve performance comparable to supervised models trained with large amounts of labeled data.

Semi-supervised learning approaches utilize unlabeled data to learn hidden layer activations that best predict neighboring data (temporally or spatially close sensory features), which can then be used as the input feature to a classification network trained with small amount of labeled data (supervised training). It can be shown that semi-supervised learning with a small amount of labeled data can achieve performance comparable to supervised learning with a larger amount of data. On the other hand, self-training approaches utilize unlabeled data by using a teacher network to generate soft-labels (pseudo-labels) which can then be used to train student network. Such student-teacher training step can be repeated as long as the performance improves, with the student being a teacher in the next step. Data augmentation is often used together during student-training step for further improvements.

Data augmentation is another effective technique to boost model accuracy without requiring more training data. Augmenting data by adding reverberation or mixing with noise have been used in ASR (automatic speech recognition) and KWS (keyword spotting) with some success. Spectral augmentation is a data augmentation technique which can be shown to boost ASR accuracy significantly. For example, applying spectral augmentation on student's input can improve ASR accuracy in self-training setup.

Implementations disclosed herein can explore an application of self-training with labeled and/or unlabeled data where aggressive data augmentation (e.g., spectral augmentation) is applied to the input of both student and teacher. The proposed student-teacher training approach enables utilization of unlabeled (unsupervised) training data for the KWS problem, and can help by applying aggressive spectral augmentation to boost diversity of training data further.

Aggressive data augmentation can degrade accuracy in keyword spotting when used with supervised training with hard-labels ($\in \{0,1\}$). However, if a system applies very aggressive augmentation on a positive example, the system can end up with an example that may actually be seen as negative but still has positive label. Even if occurring infrequently, this can degrade the accuracy significantly by increasing false accept rate. With the proposed noisy student-student approach, teacher model can generates soft-labels ($\in[0,1]$) which can dynamically reflect the degree of degradation in the input pattern. In contrast, supervised-training with predetermined hard-labels cannot reflect such changes of input pattern. Techniques disclosed herein can be used to boosts accuracy of the model in more challenging conditions (accented, noisy, far-field, etc.). Such benefits can be explained from the use of large scale unlabeled data and aggressive data augmentation.

Some implementations can include a noisy student-teacher self-training approach which consists of two major stages. In the first stage, a teacher model (which is also a baseline model) can be trained using conventional supervised training method on labeled data. The learned teacher model can be passed to the second stage.

In the second stage, a student model can be trained using soft-labels generated from the teacher model trained in previous stage. Since the teacher provides the soft-label, the system can use additional unlabeled data for training the student model. Additionally or alternatively, the system can add more aggressive data augmentation (in some cases on top of existing classical data augmentation) to boost accuracy. Specifically, in some implementations the system can apply spectral augmentation which masks specific frequencies or time frames completely. Such strong modification might even change a positive pattern to a negative one, which can make an incorrect training example under supervised training method. However, in some implementations using the student-teacher approach, the teacher can compensate for such drastic changes by generating a correspondingly lower confidence. In some implementations, this can be achieved by processing the same augmented data using both the teacher and the student model.

In existing self-training with noisy-student approaches, a teacher model can be provided with clean data and only the student is given noisy (augmented) data. In some implementations described herein, providing the same noisy input to the teacher and the student may achieve better performance in the Keyword Spotting problem. This seems to be due to the difference of the problem, where KWS is a binary classification task with highly unbalanced pattern space. In KWS, the space of positive pattern is much smaller than that of negative patterns. Thus augmenting a positive pattern can easily result in moving the pattern into the space of negative patterns. Additionally or alternatively, some implementations described herein can process both labeled and unlabeled data using the teacher model to produce the soft-labels used to train the student model. In previous works, labeled data is used for computing supervised loss on the student model while unlabeled data is used to generate soft-label. Furthermore, some implementations described herein do not have separate data selection for the second stage.

$$\text{Student teacher loss} = a*\text{Loss}^E + \text{Loss}^D \quad (1)$$

$$\text{Loss}^D = \text{cross entropy}(y_d^T, y_d^S) \quad (2)$$

$$\text{Loss}^E = \text{cross entropy}(y_e^T, y_e^S) \quad (3)$$

$$y^T = [y_d^T, y_e^T] = f^T(\text{augment}(x)) \quad (4)$$

$$y^S = [y_d^S, y_e^S] = f^S(\text{augment}(x)) \quad (5)$$

In some implementations, the proposed method can be summarized by Algorithm 1 below. As shown, the system can also have multiple iterations (indexed by k) of the second stage by using the student from previous iteration $S_k$ as the teacher model $T_{k+1}$ for next iteration. In some implementations, losses for student-teacher training can computed by cross entropy (Eq. 1-5). Note that in some implementations, the system can compute two cross entropy's (a cross-entropy for an encoder label and a cross-entropy for a decoder label), since the baseline model in some implementations can have an encoder and a decoder as outputs. In some implementations, the two cross-entropy losses can be combined using weighted summation (Eq. 1).

Algorithm 1

1. Train Teacher $T_0$ with labeled data L and classic augmentation.
2. Train Student $S_k$ by
  (a) Apply aggressive augmentation on $L \cup D$ $D = \text{Augment}(L \cup D)$ (b) Use teacher to generate soft-label $y^T$ by $y^{T_k}(i) = f^{T_k}(x(i))$ for $x(i) \in D$ (c) Student model trained using CE loss by $y^{S_k}(i) = f^{S_k}(x(i))$ for $x(i) \in D$ $\text{Loss} = CE(y^{T_k}, y^{S_k})$ 3. Set $T_{k+1} = S_k$ and Repeat step 2.

In some implementations, data augmentation can work by generating multiple variations of an original data example using various transforms, effectively multiplying number of training examples seen by the model. Classic approaches include adding reverberation or mixing with noise. In some implementations, a spectral augmentation method can be used by randomly masking blocks of frequency bins. Some implementations can utilize time frame masking and/or frequency masking.

Spectral augmentation is an aggressive data augmentation, in the aspect that it masks significant portion of input frequency bins or time frames in chunks. In the automatic speech recognition (ASR) domain, such aggressive masking seems to help preventing over-fitting and facilitating the use of high level context. Also in the ASR domain, the target classes (phonemes or graphemes) can be relatively well balanced in terms of prior. Meanwhile, KWS typically is a binary classification problem where positive pattern occupies only a small pattern space, while negative patterns span all the other spaces. One can easily transform a positive pattern to be a negative one by masking chunks of frequency bins. In supervised learning with predetermined hard-labels, those labels can simply be incorrect after some augmentation. To overcome such over-augmentation issue, implementations described herein can use spectral augmentation with noisy student-teacher learning.

In some implementations, both the initial the teacher model and the student model can use the same two stage model architecture. In some implementations, the model architecture can consists of 7 simplified convolution layers and 3 projection layers, being organized into encoder and decoder sub-modules connected sequentially. The encoder module can process an input feature, such as a 40-d vector of spectral frequency energies, and generate encoder output of dimension N which can learn to encode phoneme-like sound units. The decoder model can process the encoder output as input and can generate output (e.g., binary output) that can predict the existence of a keyword in the input stream (e.g., predict the existence of a keyword in audio data capturing a spoken utterance).

In some implementations, the system can use both supervised (labeled) training data, and unsupervised (unlabeled) training data for experiments. For example, supervised training data consists of 2.5 million anonymized utterances with the keywords ("Ok Assistant" or "Hey Assistant"). In some implementations, supervised data can be labeled by large ASR model(s). As a further example, the unsupervised training data can consist of 10 million anonymized utterances with the keywords and noises. In some implementations, the unsupervised data can have relatively high noise level making it difficult for ASR model to generate reliable labels.

As described herein, self-training with noisy student-teacher learning can be used for the keyword spotting problem. In some implementations, the proposed approach can enable the use of abundant unlabeled data and aggressive augmentation. Experimental results show that models trained using the proposed approach can significantly improve accuracy on an evaluation data set with difficult conditions. Experiments can also show that applying aggressive augmentation directly in supervised learning approach may not work well for keyword spotting problem, while semi-supervised training with noisy student-teacher can benefit from aggressive augmentation and unlabeled data.

Figure 1:
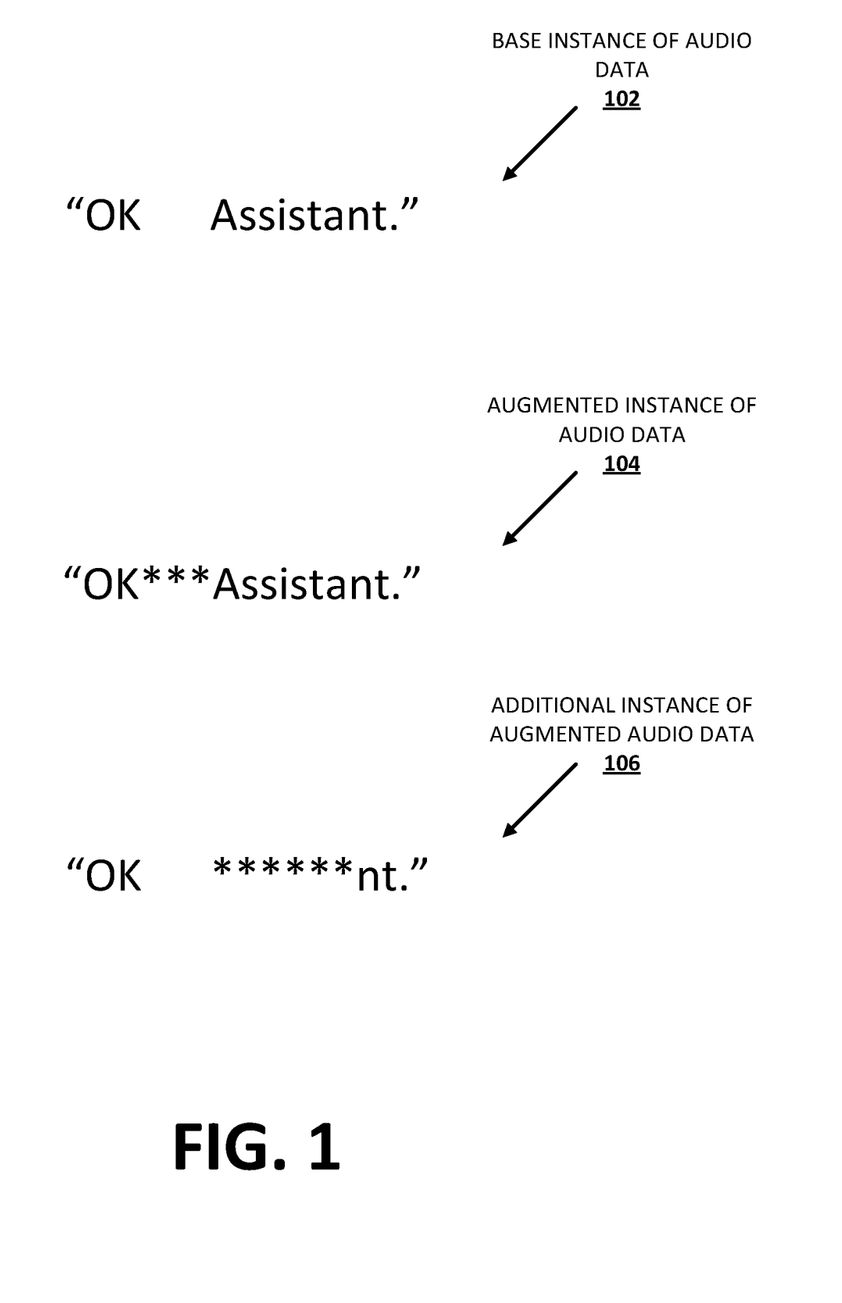
FIG. 1 illustrates an example of a base instance of audio data an examples of augmented instances of audio data in accordance with various implementations disclosed herein.

Turning now to the figures, FIG. 1 illustrates an example of a base instance of audio data an examples of augmented instances of audio data in accordance with various implementations disclosed herein. The illustrated example includes a base instance of audio data 102 capturing a spoken utterance of "OK Assistant" with a corresponding supervised label of 'true' to indicate the keyword 'OK Assistant' is included in the spoken utterance. In some implementations, the base instance of audio data can be augmented to generate an augmented instance of audio data. In some of those implementations, the base instance of audio data can be aggressively augmented to generate the augmented instance of audio data. For example, spectral augmentation can be used to generate an augmented instance of audio data based on the base instance of audio 102. Spectral augmentation can include time masking the base audio data (e.g., masking one or more time frames in the base instance of audio data) and/or frequency masking the base audio data (e.g., masking one or more audio frequencies in the base instance of audio data).

The illustrated example in FIG. 1 further includes an augmented instance of audio data 104 which is generated by masking one or more time frames between the words 'OK' and 'Assistant' in the base instance of audio data 102 such that the augmented instance of audio data 104 captures the augmented spoken utterance of "OK***Assistant" (where * indicates a masked time frame). The supervised label corresponding to the base instance of audio data of 'true' can still correctly indicate the augmented spoken utterance includes the keyword of 'OK Assistant'.

The illustrated example in FIG. 1 additionally includes an additional instance of augmented audio data 106 which is generated by masking the time frame(s) in the base instance of the audio data capturing the 'Assista' portion of the spoken utterance such that the additional instance of augmented audio data can capture the additional augmented spoken utterance of "OK *******nt" (where * indicates a masked time frame of the audio data). The additional spoken utterance captured in the additional instance of augmented audio data 106 no longer contains the keyword 'OK Assistant', therefore the supervised label corresponding to the base instance of audio data of 'true' no longer correctly corresponds to the additional augmented spoken utterance.

FIG. 1 is described with respect to the keyword "OK Assistant". However this is merely illustrative and is not meant to be limiting. A KWS model can be trained to identify the presence of additional or alternative key words, such as "Hey Assistant", "OK Computer", "Computer", "Hypothetical Café", additional or alternative keywords, and/or combinations thereof. Additionally or alternatively, a KWS model can be trained to identify multiple keywords. For example, the KWS model can be trained to identify the keyword "OK Assistant" and the keyword "Hey Assistant".

Figure 2:
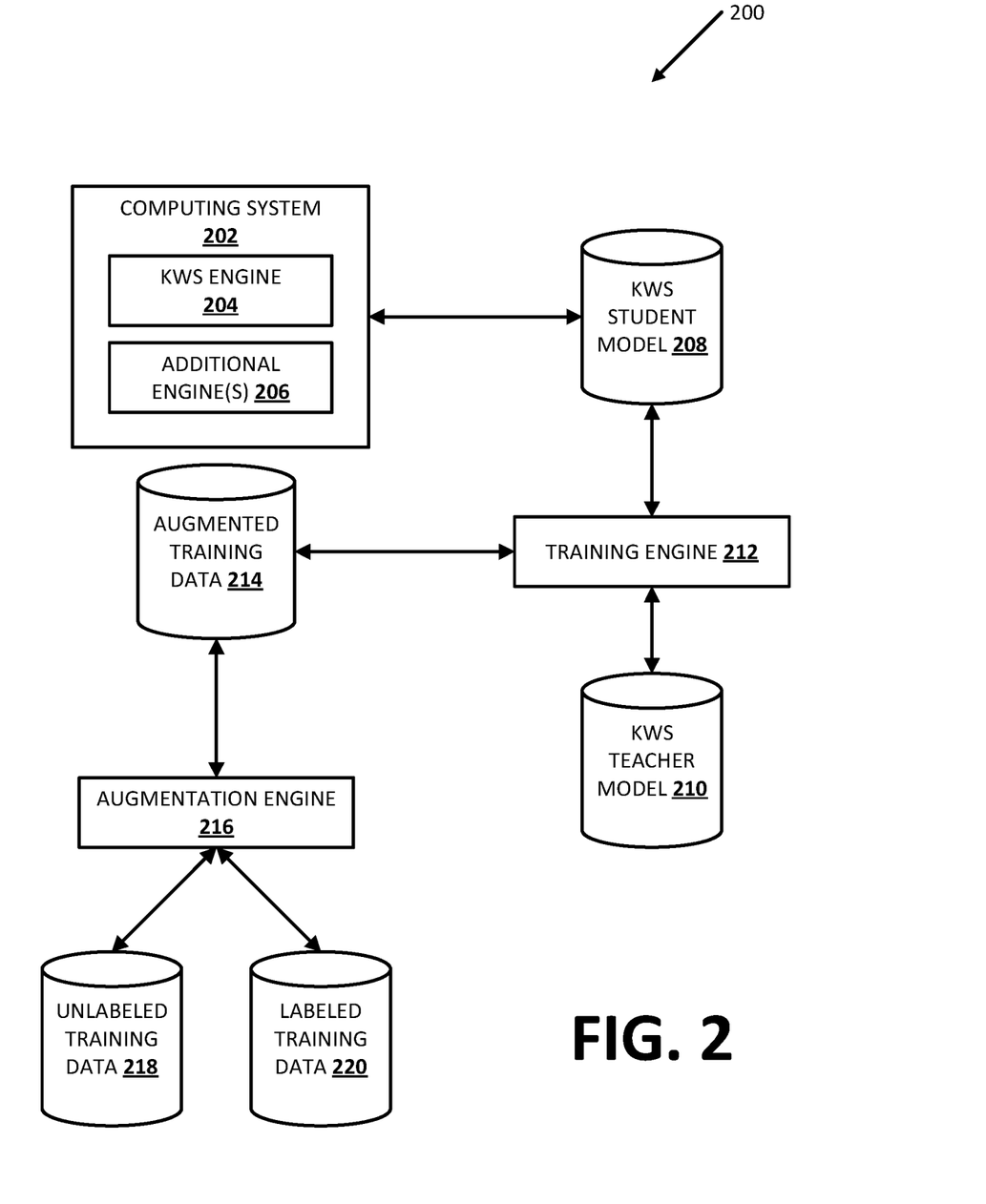
FIG. 2 illustrates an example environment in which various implementations disclosed herein may be implemented.

FIG. 2 illustrates a block diagram of an example environment 200 in which implementations disclosed herein may be implemented. The example environment 200 includes a computing system 202 which can include KWS engine 204, training engine 212, augmentation engine 216, and/or additional or alternative engine(s) 206. Additionally or alternatively, computing system 202 may be associated with KWS student model 208, KWS teacher model 210, augmented training data 214, unlabeled training data 218, labeled training data 220, additional or alternative model(s) (not depicted), and/or additional or alternative training data (not depicted).

In some implementations, computing system 202 may include may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 202 may be implemented on a computing system that also contains the user interface input/output devices.

Some non-limiting examples of computing system 202 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 202 may include one or more memories for storage of data and software applications, one or more processors for accessing data and executing applications, and other components that facilitate communication over a network. The operations performed by computing system 202 may be distributed across multiple computing devices. For example, computing programs running on one or more computers in one or more locations can be coupled to each other through a network.

In some implementations, KWS engine 204 can be used to process a spoken utterance using KWS student model 208 to generate output indicating whether the spoken utterance contains one or more keywords. In some implementations, one or more additional engines 206 can be used by the system to perform additional or alternative tasks, such as capturing the audio data using a user interface input device of the computing system, preprocessing the audio data, additional or alternative task(s), and/or combinations thereof.

In some implementations, KWS student model 208 can be trained along with KWS teacher model 210 using training engine 212, where training engine 212 utilizes a student-teacher training to train the student model with the benefit of predicted output generated using the teacher model. Training the KWS student model 208 and KWS teacher model 210 is described herein with respect to process 300 of FIG. 3. In some implementations, an initial KWS teacher model 210 can be trained using labeled training data 220 using supervised (and/or semi-supervised) learning. In in initial training iteration, training engine 212 can use the trained initial KWS teacher model 210 in training the initial iteration of the KWS student model 208. In subsequent training iterations, the KWS student model from a previous iteration can be used as the current iteration of the KWS teacher model to generate predicted output for use in training the new current iteration of the KWS student model.

In some implementations, training engine 212 can train KWS student model 208 and/or KWS teacher model 210 using augmented training data 214. Augmented training data 214 can be generated using augmentation engine 216 by processing unlabeled training 218 and/or labeled training data 220. For example, augmentation engine 216 can process a base instance of unlabeled training data 218 using aggressive augmentation (e.g., using spectral augmentation) to mask one or more portions of the base instance of audio data. An additional instance of augmented audio data can be generated using the same base instance of unlabeled training data 218 by masking one or more additional or alternative portions of the base instance of audio data. Similarly, instance (s) of augmented training data 214 can be generated using augmentation engine 216 by aggressively augmenting base instance(s) of labeled training data 220 to mask one or more portions of the base instance(s) of training data. In some implementations, augmentation engine 216 can be used to generate an increased number of training instances and/or to increase the diversity in the training instances.

Figure 3:
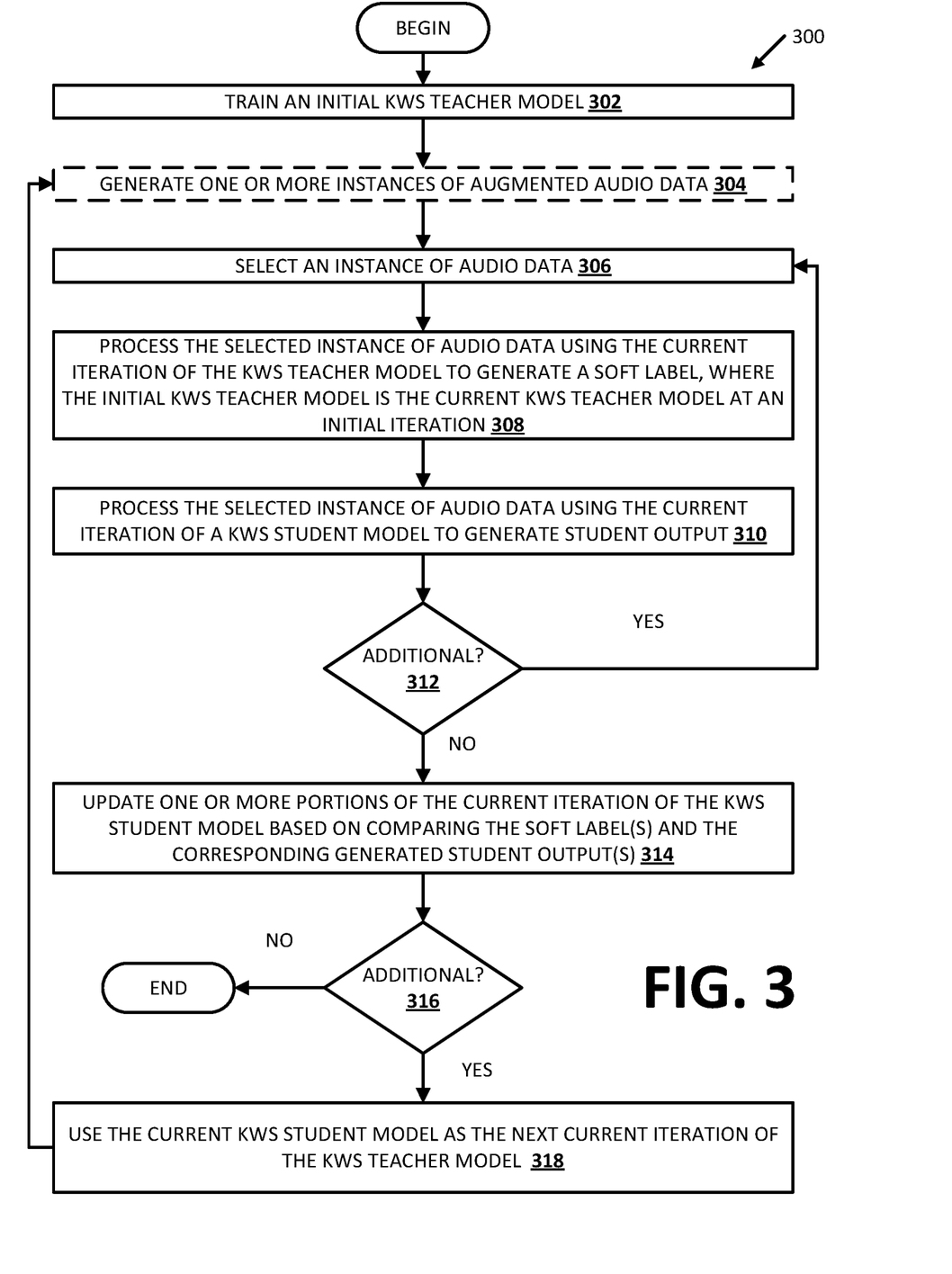
FIG. 3 is a flowchart illustrating an example process of training a KWS student model in accordance with various implementations disclosed herein.

FIG. 3 is a flowchart illustrating an example process of 300 of training a KWS student model in accordance with various implementations disclosed herein. For convenience, the operations of the flowchart are described with reference to a system that performs the operations. This system may include various components of various computer systems, such as one or more components of computing system 202, client device 502 and/or computing system 610. Moreover, while operations of process 300 are shown in a particular order, this is not meant to be limiting. One or more operations may be reordered, omitted, and/or added.

At block 302, the system trains an initial KWS teacher model. In some implementations, the initial KWS teacher model can be trained using supervised learning techniques. For example, the initial KWS teacher model can be trained using one or more training instances with, where each training instance includes an audio data portion capturing a spoken utterance, and a label portion indicating whether a keyword is included in the spoken utterance. In some implementations, the labels for the training instances can be generated in a supervised manner (i.e., the labels indicating whether there is a keyword in the corresponding audio data can be generated by a human labeler). Additionally or alternatively, the labels for the training instances can be generated in a semi-supervised manner. In some implementations, initial KWS teacher model can be trained using training engine 212 based on one or more training instances of labeled training data 220 as illustrated in FIG. 2.

At block 304, the system optionally generates one or more instances of augmented audio data. In some implementations, augmented audio data can be generated based on labeled training data and/or unlabeled training data. For example, a base instance of audio data can be aggressively augmented using spectral augmentation (e.g., masking one or more time frames of the base audio data and/or masking one or more frequency ranges in the base audio data) to generate the augmented audio data. Aggressively augmenting labeled audio data may masks portion(s) of the base audio data such that the supervised label for the corresponding base instance of audio data no longer correctly corresponds to the augmented instance of audio data. In some implementations, the system can generate a new instance of augmented audio data at each step in the training process where a new instance of augmented audio data is being processed. Additionally or alternatively, the system can generate a batch of instance of augmented audio data at the beginning of the training process. Furthermore, the system can utilize one or more previously generated instances of augmented audio data when training the KWS model. In some implementations, the instance(s) of augmented audio data 214 can be generated using augmentation engine 216 based on unlabeled training data 218 and/or labeled training data 220 as illustrated in FIG. 2.

At block 306, the system selects an instance of audio data. In some implementations, the system can select an instance of augmented audio data generated at block 304. Additionally or alternatively, the system can select an instance of base audio data used in generating one or more augmented instances of audio data. In other words, the system can train the KWS model using both the augmented instances of training data and/or the instances of base audio data used to generate the augmented instances of training data.

At block 308, the system processes the selected instance of audio data using the current iteration of the KWS teacher model to generate a soft label. In some implementations, the initial KWS teacher model is the current KWS teacher model at an initial iteration. By having a soft label, the KWS teacher model can generate output over a range indicating the likelihood the keyword is captured in the spoken utterance of the audio data (e.g., the soft label can be a value between 0 and 1), thus enabling the system to train on unlabeled training data (i.e., training data without a supervised label) and/or augmented training data (i.e., training data the supervised label may be incorrect due to the data augmentation).

At block 310, the system processes the selected instance of audio data using the current iteration of a KWS student model to generate student output. In some implementations, the student output can include a prediction of whether the selected instance of audio data includes the keyword.

At block 312, the system determines whether to process one or more additional instances of audio data for the current training iteration. In some implementations, the system can determine whether to process an additional instance of the audio data based on whether one or more conditions are satisfied, such as determining whether a threshold number of instances of audio data have been processed for the current iteration, whether there are any remaining unprocessed instances of audio data, whether additional or alternative condition(s) are satisfied, and/or combinations thereof. If so, the system proceeds back to block 306, selects an additional instance of audio data and proceeds to blocks 308 and 310 based on the additional instance of audio data. If the system determines to not process any additional instances of audio data for the current training iteration, the system can proceed to block 314.

At block 314, the system updates one or more portions of the current iteration of the KWS student model based on comparing the one or more soft labels (e.g., generated at block 308) and the one or more corresponding generated student outputs (e.g., generated at block 310), where a given soft label and a corresponding student output were generated based on processing the same instance of audio data. In some implementations, the system can update the portion(s) of the KWS student model based on a cross-entropy loss determined using the soft label(s) and the student output(s).

At block 316, the system determines whether to perform an additional training iteration. In some implementations, the system determines whether to perform an additional training iteration based of determining whether one or more additional conditions are satisfied, such as determining whether the KWS student model has been trained a threshold number of iterations, whether the KWS student model has been trained with a threshold number of instances of audio data, whether additional or alternative condition(s) are satisfied, and/or combinations thereof. If so, the system proceeds to block 318. If not, the process ends. In some implementations, the KWS student model generated in the last training iteration can be used as the KWS model to predict whether a keyword is present in a spoken utterance.

At block 318, the system uses the current KWS student model as the next current iteration of the KWS teacher model before proceeding back to block 304 to optionally generate one or more additional instances of augmented audio data. The system then proceeds to block 306, 308, 310, 312, 314, and 316 based on the one or more additional instances of augmented audio data or one or more instances of augmented audio data generated in a previous iteration.

Figure 4:
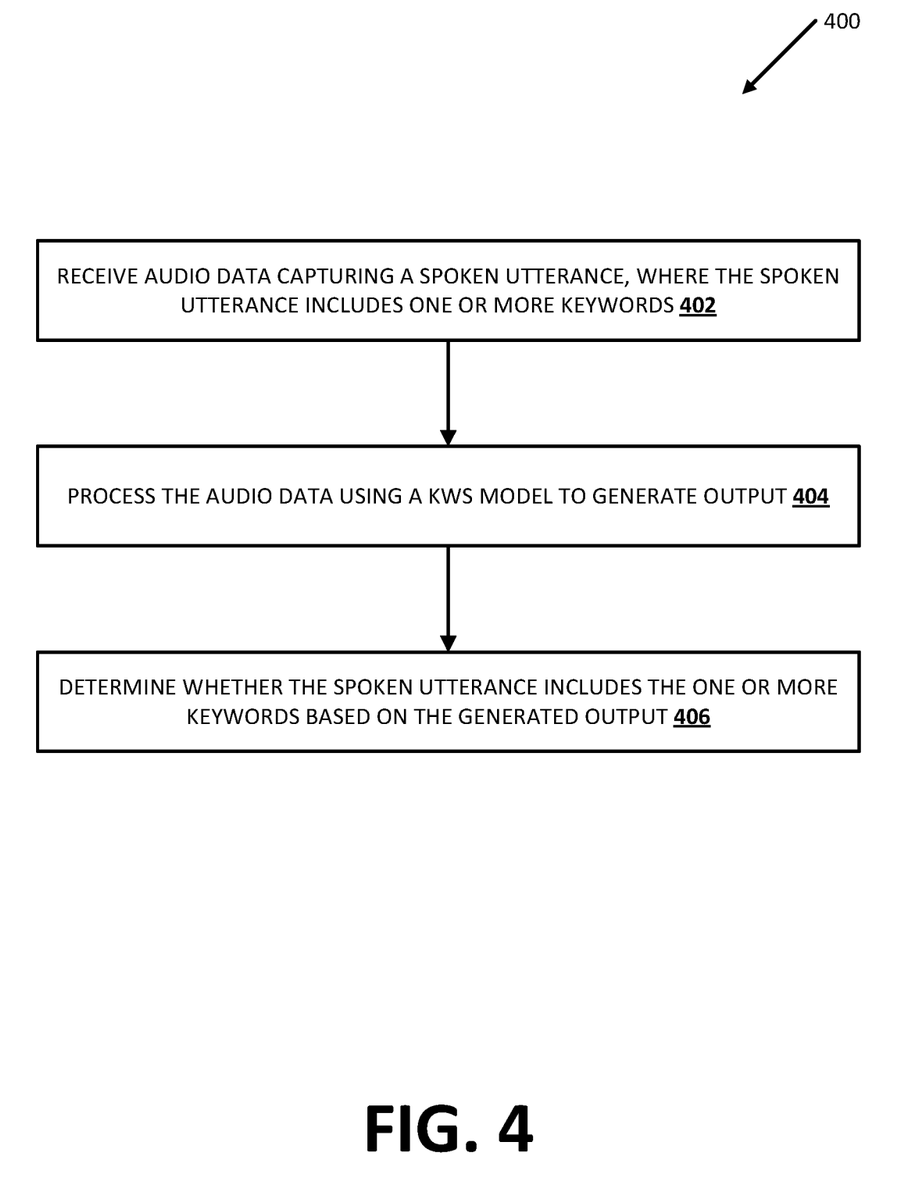
FIG. 4 is a flowchart illustrating an example process of determining whether a spoken utterance includes one or more keywords using a KWS model in accordance with various implementations disclosed herein.

FIG. 4 is a flowchart illustrating an example process of 400 of determining whether a spoken utterance includes one or more keywords using a KWS model in accordance with various implementations disclosed herein. For convenience, the operations of the flowchart are described with reference to a system that performs the operations. This system may include various components of various computer systems, such as one or more components of computing system 202, client device 502 and/or computing system 610. Moreover, while operations of process 400 are shown in a particular order, this is not meant to be limiting. One or more operations may be reordered, omitted, and/or added.

At block 402, the system receives audio data capturing a spoken utterance, where the spoken utterance includes one or more keywords. For example, the system can capture audio data of a spoken utterance of "OK Widget, widget the widget", where the corresponding KWS model is trained to detect the keyword 'OK Widget'. Additionally or alternatively, the system can capture audio data of a spoken utterance of "Hey Computer, please play hypothetical song with MUSIC PLAYER", where a first KWS model is trained to detect the keyword 'Hey Computer' and a second KWS model is trained to detect the keyword 'MUSIC PLAYER' (and/or a KWS model is trained to detect a plurality of keywords including the keyword 'Hey Computer' and the keyword 'MUSIC PLAYER'). In some implementations, the spoken utterance can be captured using one or more user interface input devices of computing system 202 as illustrated in FIG. 2.

At block 404, the system processes the audio data using a KWS model to generate output. In some implementations, the KWS model can be a KWS student model trained in accordance with process 300 of FIG. 3 described herein. For example, the KWS model can be the KWS student model trained in a final training iteration of process 300 of FIG. 3.

At block 406, the system determines whether the spoken utterance includes the one or more keywords based on the generated output. For example the output can be a binary output (e.g., 'true' or 'false'; 0 or 1, −1 or +1, etc.) indicating whether the keyword is in the spoken utterance. Additionally or alternatively, the output can be a value indicating the probability the keyword is in the spoken utterance (e.g., a number between 0 and 1, an number between 0 and 100 etc.), and the system can determine whether the output indicates the spoken utterance includes the one or more keywords based on whether the output satisfies one or more conditions (e.g., whether the output exceeds a threshold value, whether the output is equal to a threshold value, whether the output is below a threshold value, whether additional or alternative condition(s) are satisfied, and/or combinations thereof). For example, the system can process audio data capturing a spoken utterance of "Hey Assistant, turn off the light" to generate output of 89, indicating the likelihood the spoken utterance contains the keyword 'Hey Assistant'. The system can determine the output value of 89 satisfies a threshold value of 85, and thus the spoken utterance does contain the spoken utterance.

Figure 5:
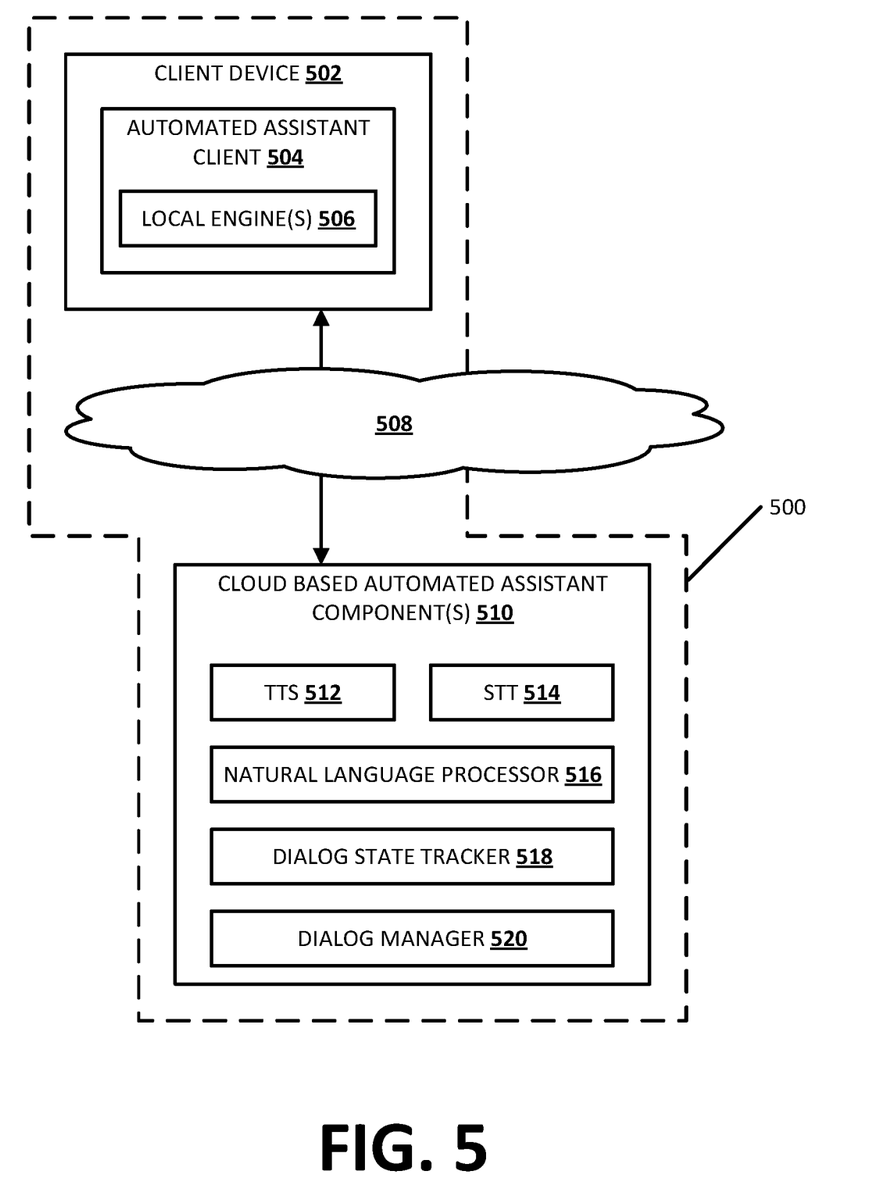
FIG. 5 illustrates a block diagram of another example environment in which implementations disclosed herein may be implemented.

Turning now to FIG. 5, an example environment is illustrated where various implementations can be performed. FIG. 5 is described initially, and includes a client computing device 502, which executes an instance of an automated assistant client 504. One or more cloud-based automated assistant components 510 can be implemented on one or more computing systems (collectively referred to as a "cloud" computing system) that are communicatively coupled to client device 502 via one or more local and/or wide area networks (e.g., the Internet) indicated generally at 508.

An instance of an automated assistant client 504, by way of its interactions with one or more cloud-based automated assistant components 510, may form what appears to be, from the user's perspective, a logical instance of an automated assistant 500 with which the user may engage in a human-to-computer dialog. An instance of such an automated assistant 500 is depicted in FIG. 5. It thus should be understood that in some implementations, a user that engages with an automated assistant client 504 executing on client device 502 may, in effect, engage with his or her own logical instance of an automated assistant 500. For the sakes of brevity and simplicity, the term "automated assistant" as used herein as "serving" a particular user will often refer to the combination of an automated assistant client 504 executing on a client device 502 operated by the user and one or more cloud-based automated assistant components 510 (which may be shared amongst multiple automated assistant clients of multiple client computing devices). It should also be understood that in some implementations, automated assistant 500 may respond to a request from any user regardless of whether the user is actually "served" by that particular instance of automated assistant 500.

The client computing device 502 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 502 may optionally operate one or more other applications that are in addition to automated assistant client 504, such as a message exchange client (e.g., SMS, MMS, online chat), a browser, and so forth. In some of those various implementations, one or more of the other applications can optionally interface (e.g., via an application programming interface) with the automated assistant 500, or include their own instance of an automated assistant application (that may also interface with the cloud-based automated assistant component(s) 510).

Automated assistant 500 engages in human-to-computer dialog sessions with a user via user interface input and output devices of the client device 502. To preserve user privacy and/or to conserve resources, in many situations a user must often explicitly invoke the automated assistant 500 before the automated assistant will fully process a spoken utterance. The explicit invocation of the automated assistant 500 can occur in response to certain user interface input received at the client device 502. For example, user interface inputs that can invoke the automated assistant 500 via the client device 502 can optionally include actuations of a hardware and/or virtual button of the client device 502. Moreover, the automated assistant client can include one or more local engines 506, such as an invocation engine that is operable to detect the presence of one or more spoken invocation phrases. The invocation engine can invoke the automated assistant 500 in response to detection of one of the spoken invocation phrases. For example, the invocation engine can invoke the automated assistant 500 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 502, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 500. As used herein, "invoking" the automated assistant 500 can include causing one or more previously inactive functions of the automated assistant 500 to be activated. For example, invoking the automated assistant 500 can include causing one or more local engines 506 and/or cloud-based automated assistant components 510 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 500.

The one or more local engine(s) 506 of automated assistant 500 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 502 is relatively constrained in terms of computing resources (e.g., processor cycles, memory, battery, etc.), the local engines 506 may have limited functionality relative to any counterparts that are included in cloud-based automated assistant components 510.

Cloud-based automated assistant components 510 leverage the virtually limitless resources of the cloud to perform more robust and/or more accurate processing of audio data, and/or other user interface input, relative to any counterparts of the local engine(s) 506. Again, in various implementations, the client device 502 can provide audio data and/or other data to the cloud-based automated assistant components 510 in response to the invocation engine detecting a spoken invocation phrase, or detecting some other explicit invocation of the automated assistant 500.

The illustrated cloud-based automated assistant components 510 include a cloud-based TTS module 512, a cloud-based STT module 514, a natural language processor 516, a dialog state tracker 518, and a dialog manager 520. In some implementations, one or more of the engines and/or modules of automated assistant 500 may be omitted, combined, and/or implemented in a component that is separate from automated assistant 500. Further, in some implementations automated assistant 500 can include additional and/or alternative engines and/or modules. Cloud-based STT module 514 can convert audio data into text, which may then be provided to natural language processor 516.

Cloud-based TTS module 512 can convert textual data (e.g., natural language responses formulated by automated assistant 500) into computer-generated speech output. In some implementations, TTS module 512 may provide the computer-generated speech output to client device 502 to be output directly, e.g., using one or more speakers. In other implementations, textual data (e.g., natural language responses) generated by automated assistant 500 may be provided to one of the local engine(s) 506, which may then convert the textual data into computer-generated speech that is output locally.

Natural language processor 516 of automated assistant 500 processes free form natural language input and generates, based on the natural language input, annotated output for use by one or more other components of the automated assistant 500. For example, the natural language processor 516 can process natural language free-form input that is textual input that is a conversion, by STT module 514, of audio data provided by a user via client device 502. The generated annotated output may include one or more annotations of the natural language input and optionally one or more (e.g., all) of the terms of the natural language input.

In some implementations, the natural language processor 516 is configured to identify and annotate various types of grammatical information in natural language input. In some implementations, the natural language processor 516 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 516 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 516 may rely on annotations from one or more other components of the natural language processor 516. In some implementations, in processing a particular natural language input, one or more components of the natural language processor 516 may use related prior input and/or other related data outside of the particular natural language input to determine one or more annotations.

In some implementations, dialog state tracker 518 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 520 may be configured to map a current dialog state, e.g., provided by dialog state tracker 518, to one or more "responsive actions" of a plurality of candidate responsive actions that are then performed by automated assistant 500. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 500 outputting additional natural language dialog. This responsive dialog may include, for instance, requests that the user provide parameters for some action (i.e., fill slots) that dialog state tracker 518 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 6:
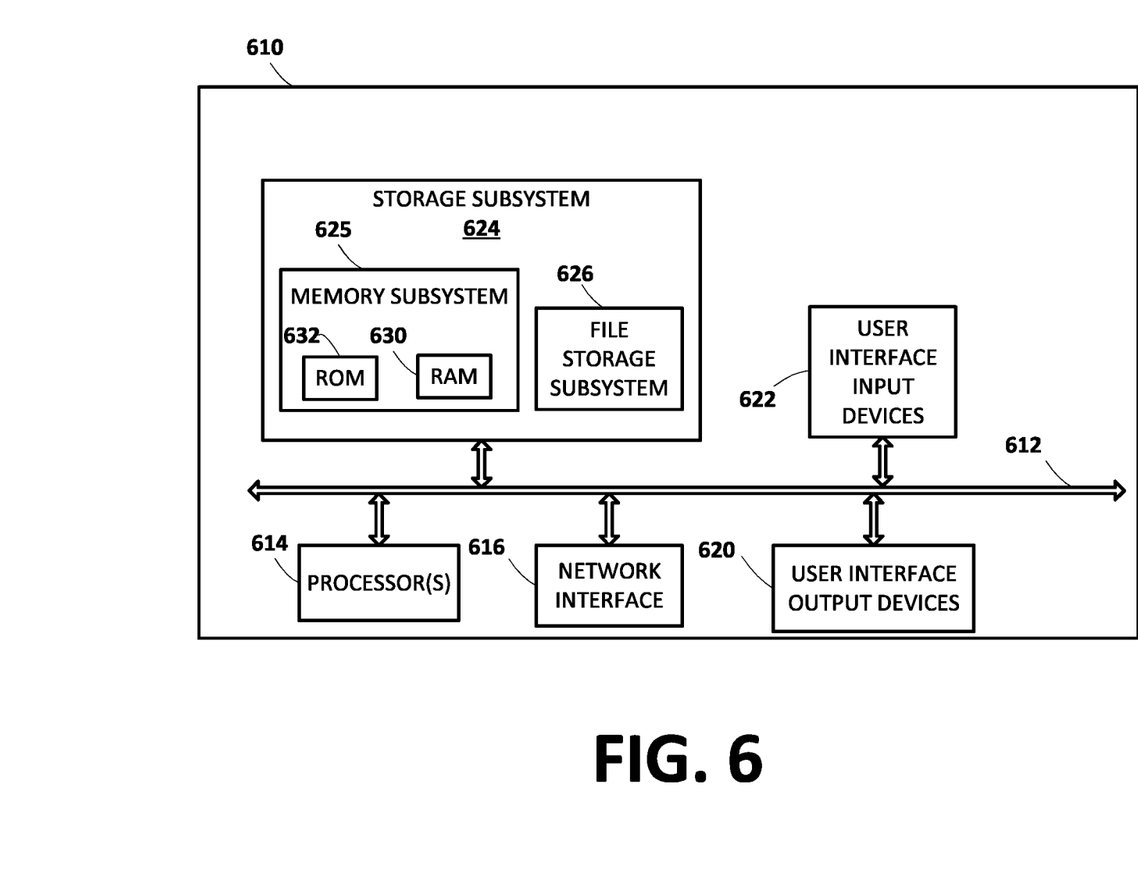
FIG. 6 illustrates an example architecture of a computing device.

FIG. 6 is a block diagram of an example computing device 610 that may optionally be utilized to perform one or more aspects of techniques described herein. In some implementations, one or more of a client computing device, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more of the processes of FIG. 3 and/or FIG. 4, as well as to implement various components depicted in FIG. 2 and/or FIG. 5.

These software modules are generally executed by processor 614 alone or in combination with other processors. Memory 625 used in the storage subsystem 624 can include a number of memories including a main random access memory ("RAM") 630 for storage of instructions and data during program execution and a read only memory ("ROM") 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors, the method includes training an initial keyword spotting ("KWS") teacher model using a labeled training data set which includes input audio features and supervised output features. The method further includes generating augmented audio data, wherein generating the augmented audio data comprises augmenting an instance of base audio data. The method further includes processing the augmented audio data using the initial KWS teacher model to generate a soft label. The method further includes processing the augmented audio data using a KWS student model to generate student output. The method further includes updating one or more portions of the KWS student model based on comparing the soft label and the generated student output.

These and other implementations of the technology can include one or more of the following features.

In some implementations, the method further includes generating additional augmented audio data, wherein generating the additional augmented audio data comprises augmenting an additional instance of base audio data. In some implementations, the method further includes processing the additional augmented audio data using the initial KWS teacher model to generate an additional soft label. In some implementations, the method further includes processing the additional augmented audio data using the KWS student model to generate additional student output. In some implementations, the method further includes further updating the one or more portions of the KWS student model based on comparing the additional soft label and the generated additional student output.

In some implementations, the method further includes subsequent to updating the one or more portions of the student model based on comparing the soft label and the generated student output, using the KWS student model as a next instance of the KWS teacher model. In some implementations, the method further includes generating additional augmented audio data, wherein generating the additional augmented audio data comprises augmenting an additional instance of base audio data. In some implementations, the method further includes processing the additional augmented audio data using the next instance of the KWS teacher model to generate an additional soft label. In some implementations, the method further includes processing the additional augmented audio data using a next instance of the KWS student model to generate additional student output. In some implementations, the method further includes updating one or more additional portions of the next instance of the KWS student model based on comparing the additional soft label and the additional student output.

In some implementations, augmenting the instance of base audio data includes aggressively augmenting the instance of base audio data. In some versions of those implementations, aggressively augmenting the instance of audio data includes processing the instance of base audio data using spectral augmentation to generate the augmented audio data, wherein the spectral augmentation includes time masking of the base audio data and/or frequency masking of the base audio data.

In some implementations, the base audio data includes a true occurrence of a keyword for which the initial KWS teach model is trained to predict, and wherein the augmented audio data fails to include the true occurrence of the keyword.

In some implementations, comparing the soft label and the generated student output includes generating a cross-entropy loss based on the soft label and the generated student output. In some of those implementations, updating the one or more portions of the KWS student model based on comparing the soft label and the generated student output includes updating the one or more portions of the KWS student model based on the cross-entropy loss.

In some implementations, the instance of base audio data is a labeled instance of base audio data, and wherein processing the augmented audio data using the initial KWS teacher model to generate the soft label includes processing the augmented audio data generated by augmenting the labeled instance of base audio data using the initial KWS teacher model to generate the soft label.

In some implementations, the instance of base audio data is an unlabeled instance of base audio data, and wherein processing the augmented audio data using the initial KWS teacher model to generate the soft label includes processing the augmented audio data generated by augmenting the unlabeled instance of base audio data using the initial KWS teacher model to generate the soft label.

In some implementations, the method further includes receiving audio data capturing a spoken utterance which includes one or more keywords. In some of those implementations, the method further includes processing the audio data using the KWS student model to generate keyword output. In some of those implementations, the method further includes determining the one or more keywords are present in the spoken utterance based on the keyword output. In some versions of those implementations, wherein the keyword output is binary classification output.

In some implementations, a method implemented by one or more processors is provided, the method includes receiving audio data capturing a spoken utterance which includes one or more keywords. In some implementations, the method further includes processing the audio data using a keyword spotting ("KWS") model to generate keyword output, wherein training the KWS model includes training an initial KWS teacher model portion of the KWS model using a labeled training data set which includes input audio features and supervised output features. In some implementations, the method further includes generating augmented audio data, wherein generating the augmented audio data comprises augmenting an instance of base audio data. In some implementations, the method further includes processing the augmented audio data using the initial KWS teacher model to generate a soft label. In some implementations, the method further includes processing the augmented audio data using a KWS student model portion of the KWS model to generate student output. In some implementations, the method further includes updating one or more portions of the KWS student model portion of the KWS model based on comparing the soft label and the generated student output. In some implementations, the method further includes determining whether the one or more keywords are present in the spoken utterance based on the keyword output.

In some implementations, a method implemented by one or more processors, the method including training an initial teacher model using a labeled training data set which includes input audio features and supervised output features. In some implementations, the method further includes generating augmented audio data, wherein generating the augmented audio data comprises augmenting an instance of base audio data using time masking and/or frequency masking of the base audio data. In some implementations, the method further includes processing the augmented audio data using the initial teacher model to generate a soft label. In some implementations, the method further includes processing the augmented audio data using a student model to generate student output. In some implementations, the method further includes updating one or more portions of the student model based on comparing the soft label and the generated student output.

These and other implementations of the technology can include one or more of the following features.

In some implementations, the method further includes generating additional augmented audio data, wherein generating the additional augmented audio data comprises augmenting an additional instance of base audio data. In some of those implementations, the method further includes processing the additional augmented audio data using the initial teacher model to generate an additional soft label. In some of those implementations, the method further includes processing the additional augmented audio data using the student model to generate additional student output. In some of those implementations, the method further includes further updating the one or more portions of the student model based on comparing the additional soft label and the generated additional student output.

In some implementations, subsequent to updating the one or more portions of the student model based on comparing the soft label and the generated student output, the method further includes using the student model as a next instance of the teacher model. In some of those implementations, the method further includes generating additional augmented audio data, wherein generating the additional augmented audio data comprises augmenting an additional instance of base audio data. In some of those implementations, the method further includes processing the additional augmented audio data using the next instance of the teacher model to generate an additional soft label. In some of those implementations, the method further includes processing the additional augmented audio data using a next instance of the student model to generate additional student output. In some of those implementations, the method further includes updating one or more additional portions of the next instance of the student model based on comparing the additional soft label and the additional student output.

In some implementations, comparing the soft label and the generated student output includes generating a cross-entropy loss based on the soft label and the generated student output. In some of those implementations, updating the one or more portions of the student model based on comparing the soft label and the generated student output includes updating the one or more portions of the student model based on the cross-entropy loss.

In some implementations, the instance of base audio data is a labeled instance of base audio data, and wherein processing the augmented audio data using the initial teacher model to generate the soft label includes processing the augmented audio data generated by augmenting the labeled instance of base audio data using the initial teacher model to generate the soft label.

In some implementations, the instance of base audio data is an unlabeled instance of base audio data, and wherein processing the augmented audio data using the initial teacher model to generate the soft label includes processing the augmented audio data generated by augmenting the unlabeled instance of base audio data using the initial teacher model to generate the soft label.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    training an initial keyword spotting ("KWS") teacher model using a labeled training data set which includes input audio features and supervised output features;
    processing a labeled instance of base audio data using the initial KWS teacher model to generate a given soft label, where the given soft label indicates there is an occurrence, of a keyword for which the initial KWS teacher model is trained to predict, in the labeled instance of base audio data;
    generating augmented audio data, wherein generating the augmented audio data comprises augmenting the labeled instance of the base audio data;
    processing the augmented audio data using the initial KWS teacher model to generate a further soft label, where the further soft label fails to indicate there is an occurrence of the keyword in the augmented audio data;
    processing the augmented audio data using a KWS student model to generate student output;
    updating one or more portions of the KWS student model based on comparing the further soft label and the generated student output; and
    subsequent to updating the one or more portions of the KWS student model based on comparing the further soft label and the generated student output:
        providing the KWS student model to a client device for use in determining, based on processing audio data using the KWS student model, whether the audio data includes one or more keywords.

2. The method of claim 1, further comprising:
    generating additional augmented audio data, wherein generating the additional augmented audio data comprises augmenting an additional instance of base audio data, where processing the additional instance of base audio data using the KWS teacher model generates another soft label, and where the other soft label indicates there is an occurrence, of the keyword for which the initial KWS teacher model is trained to predict, in the additional instance of base audio data;
    processing the additional augmented audio data using the initial KWS teacher model to generate an additional soft label, where the additional soft label fails to indicate there is an occurrence of the keyword in the additional augmented audio data;
    processing the additional augmented audio data using the KWS student model to generate additional student output; and
    further updating the one or more portions of the KWS student model based on comparing the additional soft label and the generated additional student output.

3. The method of claim 1, further comprising:
subsequent to updating the one or more portions of the student model based on comparing the further soft label and the generated student output, using the KWS student model as a next instance of the KWS teacher model;
generating additional augmented audio data, wherein generating the additional augmented audio data comprises augmenting an additional instance of base audio data, where processing the additional instance of base audio data using the KWS teacher model generates another soft label, and where the additional soft label indicates there is an occurrence, of the keyword for which the initial KWS teacher model is trained to predict, in the additional instance of base audio data;
processing the additional augmented audio data using the next instance of the KWS teacher model to generate an additional soft label, wherein the additional soft label fails to indicate there is an occurrence of the keyword in the additional augmented audio data;
processing the additional augmented audio data using a next instance of the KWS student model to generate additional student output; and
updating one or more additional portions of the next instance of the KWS student model based on comparing the additional soft label and the additional student output.

4. The method of claim 1, wherein augmenting the instance of base audio data comprises:
aggressively augmenting the instance of base audio data.

5. The method of claim 4, wherein aggressively augmenting the instance of audio data comprises:
processing the instance of base audio data using spectral augmentation to generate the augmented audio data, wherein the spectral augmentation includes time masking of the base audio data and/or frequency masking of the base audio data.

6. The method of claim 1, wherein comparing the further soft label and the generated student output comprises:
generating a cross-entropy loss based on the further soft label and the generated student output; and
wherein updating the one or more portions of the KWS student model based on comparing the further soft label and the generated student output comprises:
updating the one or more portions of the KWS student model based on the cross-entropy loss.

7. A method implemented by one or more processors, the method comprising:
receiving audio data capturing a spoken utterance which includes one or more keywords;
processing the audio data using a keyword spotting ("KWS") model to generate keyword output, wherein training the KWS model comprises:
training an initial KWS teacher model portion of the KWS model using a labeled training data set which includes input audio features and supervised output features;
processing a labeled instance of base audio data using the initial KWS teacher model to generate a given soft label, where the given soft label indicates there is an occurrence, of a keyword for which the initial KWS teacher model is trained to predict, in the labeled instance of base audio data
generating augmented audio data, wherein generating the augmented audio data comprises augmenting the instance of the labeled base audio data;
processing the augmented audio data using the initial KWS teacher model to generate a further soft label, where the further soft label fails to indicate there is an occurrence of the keyword in the augmented audio data;
processing the augmented audio data using a KWS student model portion of the KWS model to generate student output; and
updating one or more portions of the KWS student model portion of the KWS model based on comparing the further soft label and the generated student output; and
subsequent to updating the one or more portions of the KWS student model based on comparing the further soft label and the generated student output:
providing the KWS student model to a client device for use in determining, based on processing the audio data using the KWS student model, whether the one or more keywords are present in the spoken utterance based on the keyword output.

8. A method implemented by one or more processors, the method comprising:
training an initial teacher model using a labeled training data set which includes input audio features and supervised output features;
processing a labeled instance of base audio data using the initial teacher model to generate a given soft label, where the given soft label indicates there is an occurrence of a parameter for which the initial teacher model is trained to predict, in the labeled instance of base audio data;
generating augmented audio data, wherein generating the augmented audio data comprises augmenting the labeled instance of the base audio data using time masking and/or frequency masking of the base audio data;
processing the augmented audio data using the initial teacher model to generate a further soft label, wherein the further soft label fails to indicate there is an occurrence of the parameter, in the augmented audio data;
processing the augmented audio data using a student model to generate student output;
updating one or more portions of the student model based on comparing the further soft label and the generated student output; and
subsequent to updating the one or more portions of the student model based on comparing the further soft label and the generated student output:
providing the student model to a client device for use in determining, based on processing audio data using the student model, whether the audio data includes one or more keywords.

9. The method of claim 8, further comprising:
generating additional augmented audio data, wherein generating the additional augmented audio data comprises augmenting an additional instance of base audio data, wherein processing the additional instance of base audio data using the teacher model generates another soft label, and wherein the other soft label indicates there is an occurrence, of the parameter for which the initial teacher model is trained to predict, in the additional instance of base audio data;
processing the additional augmented audio data using the initial teacher model to generate an additional soft label, wherein the additional soft label fails to indicate there is an occurrence of the parameter in the additional augmented audio data;

processing the additional augmented audio data using the student model to generate additional student output; and further updating the one or more portions of the student model based on comparing the additional soft label and the generated additional student output.

10. The method of claim 8, further comprising:

subsequent to updating the one or more portions of the student model based on comparing the further soft label and the generated student output, using the student model as a next instance of the teacher model;

generating additional augmented audio data, wherein generating the additional augmented audio data comprises augmenting an additional instance of base audio data, wherein processing the additional instance of base audio data using the teacher model generates another soft label, and wherein the other soft label indicates there is an occurrence, of the parameter for which the initial teacher model is trained to predict, in the additional instance of base audio data;

processing the additional augmented audio data using the next instance of the teacher model to generate an additional soft label, wherein the additional soft label fails to indicate there is an occurrence of the parameter in the additional augmented audio data;

processing the additional augmented audio data using a next instance of the student model to generate additional student output; and updating one or more additional portions of the next instance of the student model based on comparing the additional soft label and the additional student output.

11. The method of claim 8, wherein comparing the further soft label and the generated student output comprises:

generating a cross-entropy loss based on the further soft label and the generated student output; and wherein updating the one or more portions of the student model based on comparing the further soft label and the generated student output comprises:

updating the one or more portions of the student model based on the cross-entropy loss.

* * * * *